United States Patent
Gyotoku (10) Patent No.: US 8,199,201 B2
(45) Date of Patent: Jun. 12, 2012

(54) PRINTING SYSTEM, PRINTING APPARATUS, IMAGE SENSING APPARATUS, AND CONTROL METHOD

(75) Inventor: Takashi Gyotoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 525 days.

(21) Appl. No.: 12/159,176

(22) PCT Filed: Feb. 1, 2007

(86) PCT No.: PCT/JP2007/052155
§ 371 (c)(1),
(2), (4) Date: Jun. 25, 2008

(87) PCT Pub. No.: WO2007/089028
PCT Pub. Date: Aug. 9, 2007

(65) Prior Publication Data
US 2010/0271492 A1    Oct. 28, 2010

(30) Foreign Application Priority Data

Feb. 2, 2006   (JP) .................................. 2006-026178

(51) Int. Cl.
*H04N 5/225* (2006.01)
(52) U.S. Cl. .................................................. 348/207.2
(58) Field of Classification Search ............... 348/207.2
See application file for complete search history.

(56) References Cited

U.S. PATENT DOCUMENTS

| | | | |
|---|---|---|---|
| 6,259,829 B1 * | 7/2001 | Bleecker et al. ............. 382/306 |
| 7,354,123 B2 * | 4/2008 | Otsuki ............................. 347/5 |
| 7,375,848 B2 * | 5/2008 | Nakami et al. ................. 358/1.9 |
| 7,676,105 B2 * | 3/2010 | Eruhimov et al. ............. 382/243 |
| 7,782,366 B2 * | 8/2010 | Imai ............................ 348/222.1 |
| 2002/0167592 A1 * | 11/2002 | Toyoda et al. ............. 348/207.1 |
| 2003/0142224 A1 * | 7/2003 | Fukuda et al. ............. 348/231.3 |
| 2003/0156196 A1 * | 8/2003 | Kato et al. ................. 348/207.2 |
| 2004/0021901 A1 | 2/2004 | Watanabe ................... 358/1.15 |
| 2004/0141083 A1 * | 7/2004 | Takashima ............... 348/333.01 |
| 2004/0160632 A1 | 8/2004 | Kato et al. .................. 358/1.15 |
| 2004/0183913 A1 * | 9/2004 | Russell ..................... 348/207.2 |

(Continued)

FOREIGN PATENT DOCUMENTS

CN    1508757 A    6/2004

(Continued)

OTHER PUBLICATIONS

PCT International Search Report in Application No. PCT/JP2007/052155 dated May 29, 2007.

(Continued)

*Primary Examiner* — Lin Ye
*Assistant Examiner* — Amy Hsu
(74) *Attorney, Agent, or Firm* — Fitzpatrick, Cella, Harper & Scinto (57) ABSTRACT

In a printing system in which a printer and digital camera are connected and image data transmitted by the digital camera is received and printed by the printer, the printer transmits information about image correction functions supported by the printer to the digital camera, the digital camera sets image correction parameters based on the transmitted information and stores them in a memory of the digital camera, and before printing the image data, the printer reads out the image correction parameters stored in the memory and corrects the image data to be printed, using the read-out image correction parameters.

16 Claims, 10 Drawing Sheets

U.S. PATENT DOCUMENTS

| | | | |
|---|---|---|---|
| 2004/0223060 A1* | 11/2004 | Yasuda | 348/207.1 |
| 2006/0002726 A1 | 1/2006 | Fukui | 399/49 |
| 2006/0038886 A1* | 2/2006 | Ichikawa et al. | 348/207.2 |
| 2006/0039020 A1 | 2/2006 | Sasaki | 358/1.13 |
| 2006/0290960 A1 | 12/2006 | Matsuhira | 358/1.12 |
| 2007/0195362 A1 | 8/2007 | Yamada et al. | 358/1.15 |
| 2007/0273898 A1* | 11/2007 | Toda | 358/1.6 |
| 2008/0192121 A1* | 8/2008 | Hashimoto | 348/207.2 |

FOREIGN PATENT DOCUMENTS

| | | |
|---|---|---|
| CN | 1522866 A | 8/2004 |
| JP | 2002-314724 | 10/2002 |
| JP | 2002-314724 A | 10/2002 |
| JP | 2004-72350 A | 3/2004 |
| JP | 2004-255609 | 9/2004 |
| JP | 2004-255609 A | 9/2004 |
| JP | 2004-274728 A | 9/2004 |
| JP | 2005-287015 A | 10/2005 |
| JP | 2006-60592 A | 3/2006 |

OTHER PUBLICATIONS

Mar. 28, 2012 Chinese Official Action in Chinese Patent Appln. No. 200780004262.3.

* cited by examiner

| | NATURAL | NATURAL M | MONOCHROME | WARM TONE | COLD TONE |
|---|---|---|---|---|---|
| ADJUST LEVELS | UNSETTABLE | OFF/AUTO/MANUAL | OFF/AUTO/MANUAL | OFF/AUTO/MANUAL | OFF/AUTO/MANUAL |
| BRIGHTNESS CORRECTION | −3~0~+3 | −3~0~+3 | −3~0~+3 | −3~0~+3 | −3~0~+3 |
| BRIGHTEN FACE | OFF/ON | OFF/ON | OFF/ON | OFF/ON | OFF/ON |
| RED-EYE CORRECTION | OFF/ON | OFF/ON | OFF/ON | OFF/ON | OFF/ON |
| CONTRAST | UNSETTABLE | −3~0~+3 | UNSETTABLE | UNSETTABLE | UNSETTABLE |
| SATURATION | UNSETTABLE | −3~0~+3 | UNSETTABLE | UNSETTABLE | UNSETTABLE |
| COLOR TONE | UNSETTABLE | −3~0~+3 | UNSETTABLE | UNSETTABLE | UNSETTABLE |
| COLOR BALANCE | UNSETTABLE | GM BA±9 | UNSETTABLE | UNSETTABLE | UNSETTABLE |

| ITEM | ID CLASSIFICATION | ID ITEM | Type | Count | Value 1 | Value 2 | Value 3 | Value 4 | Value 5 | Value 6 | Value 7 | Value 8 |
|---|---|---|---|---|---|---|---|---|---|---|---|---|
| BASE COLOR 1 | 0x80 | 0x01 | 0x01 | 0x01 | 0x01 | 0x00 | 0x00 | 0x00 | 0x00 | 0x00 | 0x00 | 0x00 |
| | 0x30 | 0x01 | 0x04 | 0x01 | 0x00000000 | | 0x00000160 | | | | | |
| BRIGHTNESS CORRECTION | 0x12 | 0x01 | 0x01 | 0x04 | 0x00 | 0x01 | 0x02 | 0x00 | 0x00 | 0x00 | 0x00 | 0x00 |
| | 0x11 | 0x01 | 0x07 | 0x04 | 0xFE | 0x02 | 0x01 | 0x81 | 0x00 | 0x00 | 0x00 | 0x00 |
| CONTRAST | 0x12 | 0x02 | 0x01 | 0x02 | 0x00 | 0x01 | 0x00 | 0x00 | 0x00 | 0x00 | 0x00 | 0x00 |
| | 0x11 | 0x02 | 0x07 | 0x00 | 0x00 | 0x00 | 0x00 | 0x00 | 0x00 | 0x00 | 0x00 | 0x00 |
| SATURATION | 0x12 | 0x03 | 0x01 | 0x02 | 0x00 | 0x01 | 0x00 | 0x00 | 0x00 | 0x00 | 0x00 | 0x00 |
| | 0x11 | 0x03 | 0x07 | 0x00 | 0x00 | 0x00 | 0x00 | 0x00 | 0x00 | 0x00 | 0x00 | 0x00 |
| COLOR TONE | 0x12 | 0x04 | 0x01 | 0x02 | 0x00 | 0x01 | 0x00 | 0x00 | 0x00 | 0x00 | 0x00 | 0x00 |
| | 0x11 | 0x04 | 0x07 | 0x00 | 0x00 | 0x00 | 0x00 | 0x00 | 0x00 | 0x00 | 0x00 | 0x00 |
| LEVEL CORRECTION | 0x22 | 0x05 | 0x01 | 0x02 | 0x00 | 0x01 | 0x02 | 0x00 | 0x00 | 0x00 | 0x00 | 0x00 |
| SHADOW | 0x11 | 0x06 | 0x01 | 0x00 | 0x00 | 0x00 | 0x00 | 0x00 | 0x00 | 0x00 | 0x00 | 0x00 |
| HIGHLIGHT | 0x11 | 0x07 | 0x01 | 0x00 | 0x00 | 0x00 | 0x00 | 0x00 | 0x00 | 0x00 | 0x00 | 0x00 |
| BRIGHTEN FACE | 0x12 | 0x08 | 0x01 | 0x03 | 0x00 | 0x01 | 0x02 | 0x00 | 0x00 | 0x00 | 0x00 | 0x00 |
| RED-EYE CORRECTION | 0x12 | 0x09 | 0x01 | 0x03 | 0x00 | 0x01 | 0x02 | 0x00 | 0x00 | 0x00 | 0x00 | 0x00 |
| NOISE REDUCTION | 0x12 | 0x0A | 0x01 | 0x03 | 0x00 | 0x01 | 0x02 | 0x00 | 0x00 | 0x00 | 0x00 | 0x00 |
| COLOR BALANCE <R> | 0x12 | 0x0D | 0x01 | 0x02 | 0x00 | 0x01 | 0x00 | 0x00 | 0x00 | 0x00 | 0x00 | 0x00 |
| | 0x11 | 0x0D | 0x07 | 0x00 | 0x00 | 0x00 | 0x00 | 0x00 | 0x00 | 0x00 | 0x00 | 0x00 |
| COLOR BALANCE <G> | 0x12 | 0x0E | 0x01 | 0x02 | 0x00 | 0x01 | 0x00 | 0x00 | 0x00 | 0x00 | 0x00 | 0x00 |
| | 0x11 | 0x0E | 0x07 | 0x00 | 0x00 | 0x00 | 0x00 | 0x00 | 0x00 | 0x00 | 0x00 | 0x00 |
| COLOR BALANCE <B> | 0x12 | 0x0F | 0x01 | 0x02 | 0x00 | 0x01 | 0x00 | 0x00 | 0x00 | 0x00 | 0x00 | 0x00 |
| | 0x11 | 0x0F | 0x07 | 0x00 | 0x00 | 0x00 | 0x00 | 0x00 | 0x00 | 0x00 | 0x00 | 0x00 |

FIG. 10

| | ID | | Type | Count | Value | | | | | | | |
|---|---|---|---|---|---|---|---|---|---|---|---|---|
| | CLASSIFICATION | ITEM | | | 1 | 2 | 3 | 4 | 5 | 6 | 7 | 8 |
| BASE COLOR 1 | 0x80 | 0x01 | 0x01 | 0x01 | 0x01 | 0x00 | 0x00 | 0x00 | 0x00 | 0x00 | 0x00 | 0x00 |
| | 0x30 | 0x01 | 0x04 | 0x00 | 0x81 | 0x00000000 | | | | | 0x00000000 | |
| BRIGHTNESS CORRECTION | 0x12 | 0x01 | 0x01 | 0x01 | 1 | 0x00 | 0x00 | 0x00 | 0x00 | 0x00 | 0x00 | 0x00 |
| | 0x11 | 0x01 | 0x07 | 0x01 | 0x01 | 0x00 | 0x00 | 0x00 | 0x00 | 0x00 | 0x00 | 0x00 |
| CONTRAST | 0x12 | 0x02 | 0x01 | 0x01 | 0x01 | 0x00 | 0x00 | 0x00 | 0x00 | 0x00 | 0x00 | 0x00 |
| | 0x11 | 0x02 | 0x07 | 0x00 | 0x00 | 0x00 | 0x00 | 0x00 | 0x00 | 0x00 | 0x00 | 0x00 |
| SATURATION | 0x12 | 0x03 | 0x01 | 0x01 | 0x01 | 0x00 | 0x00 | 0x00 | 0x00 | 0x00 | 0x00 | 0x00 |
| | 0x11 | 0x03 | 0x07 | 0x00 | 0x00 | 0x00 | 0x00 | 0x00 | 0x00 | 0x00 | 0x00 | 0x00 |
| COLOR TONE | 0x12 | 0x04 | 0x01 | 0x01 | 0x01 | 0x00 | 0x00 | 0x00 | 0x00 | 0x00 | 0x00 | 0x00 |
| | 0x11 | 0x04 | 0x07 | 0x00 | 0x00 | 0x00 | 0x00 | 0x00 | 0x00 | 0x00 | 0x00 | 0x00 |
| LEVEL CORRECTION | 0x22 | 0x05 | 0x01 | 0x01 | 0x01 | 0x00 | 0x00 | 0x00 | 0x00 | 0x00 | 0x00 | 0x00 |
| SHADOW | 0x11 | 0x06 | 0x01 | 0x01 | 0x00 | 0x00 | 0x00 | 0x00 | 0x00 | 0x00 | 0x00 | 0x00 |
| HIGHLIGHT | 0x11 | 0x07 | 0x01 | 0x01 | 0x01 | 0x00 | 0x00 | 0x00 | 0x00 | 0x00 | 0x00 | 0x00 |
| BRIGHTEN FACE | 0x12 | 0x08 | 0x01 | 0x01 | 0x02 | 0x00 | 0x00 | 0x00 | 0x00 | 0x00 | 0x00 | 0x00 |
| RED-EYE CORRECTION | 0x12 | 0x09 | 0x01 | 0x01 | 0x01 | 0x00 | 0x00 | 0x00 | 0x00 | 0x00 | 0x00 | 0x00 |
| NOISE REDUCTION | 0x12 | 0x0A | 0x01 | 0x01 | 0x01 | 0x00 | 0x00 | 0x00 | 0x00 | 0x00 | 0x00 | 0x00 |
| COLOR BALANCE <R> | 0x12 | 0x0D | 0x01 | 0x01 | 0x01 | 0x00 | 0x00 | 0x00 | 0x00 | 0x00 | 0x00 | 0x00 |
| | 0x11 | 0x0D | 0x07 | 0x00 | 0x00 | 0x00 | 0x00 | 0x00 | 0x00 | 0x00 | 0x00 | 0x00 |
| COLOR BALANCE <G> | 0x12 | 0x0E | 0x01 | 0x01 | 0x01 | 0x00 | 0x00 | 0x00 | 0x00 | 0x00 | 0x00 | 0x00 |
| | 0x11 | 0x0E | 0x07 | 0x00 | 0x00 | 0x00 | 0x00 | 0x00 | 0x00 | 0x00 | 0x00 | 0x00 |
| COLOR BALANCE <B> | 0x12 | 0x0F | 0x01 | 0x01 | 0x01 | 0x00 | 0x00 | 0x00 | 0x00 | 0x00 | 0x00 | 0x00 |
| | 0x11 | 0x0F | 0x07 | 0x00 | 0x00 | 0x00 | 0x00 | 0x00 | 0x00 | 0x00 | 0x00 | 0x00 |

PRINTING SYSTEM, PRINTING APPARATUS, IMAGE SENSING APPARATUS, AND CONTROL METHOD

TECHNICAL FIELD

The present invention relates to a technique for performing image correction according to the user's preferences in a printing system in which a printing apparatus such as a printer and an image sensing apparatus such as a digital camera communicate directly to allow images recorded by the image sensing apparatus to be printed by the printing apparatus.

BACKGROUND ART

A method called direct printing is widely known. According to this method, a printer and a digital camera are connected directly via a USB or other interface, and images recorded on a recording medium in the digital camera are printed using the printer. Since this method allows images to be printed without using a personal computer, it is widely accepted as a simple printing method.

However, the brightness and color tone of the generated images vary with the manufacturer and model of the digital camera, and the brightness and color tone of the printed images vary with the model of the printer. Therefore, there are often differences between the image that the user wants and the image actually printed by the printer.

To deal with this problem, Japanese Patent Laid-Open No. 2002-314724, for example, discloses a method described below. Namely, an image file is generated on a camera, where the image file contains image processing control data consisting of parameters such as brightness and contrast set before photo-taking, as well as image data obtained by photo-taking. Then the image data is printed, based on the image processing control data, to produce an image according to the user's preferences from an image output apparatus.

Also, Japanese Patent Laid-Open No. 2004-255609, for example, discloses a method described below. Namely, a control panel of a printer called a photo direct printer is presented on a display unit such as a liquid crystal panel of a digital camera, where the control panel of the photo direct printer allows the user to make settings for image correction and the like. Next, information equivalent to information specified by directly operating the control panel of the photo direct printer is specified using the control panel presented on the digital camera and transmitted from the digital camera to the printer.

With recent increases in the pixel counts of digital cameras, the size of an image file has been increasing such that an image file created by a digital camera with an effective pixel count of millions of pixels can sometimes result in megabytes of data. With a technique disclosed in Japanese Patent Laid-Open No. 2002-314724, when a user changes image processing control data after taking a picture, the image file is loaded onto the camera memory once and updated based on the changed image processing control data to create an image file again. The time required for this process depends on the CPU performance of the digital camera. Also, longer processing time is required as the image file size increases with increases in the pixel count. Besides, memory for use in loading the sensed image is also needed, and the file size and pixel count will be limited depending on the amount of memory.

With the recent spread of direct printing, it has become possible to print easily by directly connecting a digital camera not only with a photo direct printer, but also with any of various models of printer, ranging from low-end models to high-end models. However, Japanese Patent Laid-Open No. 2004-255609 does not disclose how the digital camera acquires information as to what functions the connected printer has and what settings are available. For example, when the digital camera is connected to a low-end printer and information specified on the control panel of the camera includes a setting of functions which the low-end printer does not have, if printing is performed on the connected printer based on the information specified on the camera, it is extremely difficult for the user to tell whether the settings are not reflected or do not have much effect if reflected.

According to a direct print protocol such as PictBridge, printing is performed as a print job containing print conditions, such as the images to be printed and the type and size of paper, is sent to the printer. By utilizing this function, it is conceivable to add image processing control data such as what is described in Japanese Patent Laid-Open No. 2002-314724 to the print conditions in the print job for notifying the printer of the data. However, as items of the image processing control data increase with expansion in the functionality of printers, the image processing control data itself increases in volume. Besides, when multiple images are printed, image processing control data for the multiple images is added to the print job, resulting in an increase in the size of the print job. Consequently, the printer must hold the large amount of data it receives, requiring a large amount of memory. This obstructs the ongoing size and cost reductions of printers.

DISCLOSURE OF INVENTION

The present invention has been made in consideration of the above situation, and has as its object to make it possible to perform image correction in a direct printing environment between an image sensing apparatus such as a digital camera and an image output apparatus such as a printer while reflecting the user's preferences as well as making the most of the functions of the image output apparatus.

According to the present invention, the foregoing object is attained by providing a printing system in which a printing apparatus and an image sensing apparatus are connected and image data transmitted by the image sensing apparatus is received and printed by the printing apparatus, wherein: the image sensing apparatus comprises: a reception unit that receives information about image correction functions supported by the printing apparatus from the printing apparatus, a setting unit that sets image correction parameters for correction of image data based on the information about image correction functions received by the reception unit, and a storage unit that stores the image correction parameters set by the setting unit; and the printing apparatus comprises: a transmission unit that transmits to the image sensing apparatus the information about the image correction functions that the printing apparatus supports, a read-out unit that reads out the image correction parameters stored in the storage unit before printing the image data, and a correction unit that corrects the image data to be printed, using the image correction parameters read out by the read-out unit.

The foregoing object is also attained by providing an image sensing apparatus capable of making image data printed by transmitting the image data to a printing apparatus, comprising: a reception unit that receives information about image correction functions supported by the printing apparatus from the printing apparatus when the image sensing apparatus is connected to the printing apparatus; a setting unit that sets image correction parameters for correction of image data based on the information about image correction functions received by the reception unit; and a storage unit that stores the image correction parameters set by the setting unit.

Further, the foregoing object is also attained by providing a printing apparatus that receives and prints image data transmitted from an image sensing apparatus, comprising: a transmission unit that transmits to the image sensing apparatus information about image correction functions that the printing apparatus supports when the printing apparatus is connected to the image sensing apparatus; a read-out unit that reads image correction parameters set by the image sensing apparatus based on the information about the image correction functions out of the image sensing apparatus before printing the image data; and a correction unit that corrects the image data to be printed, using the image correction parameters read out by the read-out unit.

Furthermore, the foregoing object is also attained by providing a control method for a printing system in which a printing apparatus and an image sensing apparatus are connected and image data transmitted by the image sensing apparatus is received and printed by the printing apparatus, the method comprising: transmitting information about image correction functions supported by the printing apparatus from the printing apparatus to the image sensing apparatus; setting image correction parameters in order for the image sensing apparatus to correct image data, based on the transmitted information about the image correction functions; storing the set image correction parameters, in the image sensing apparatus; reading out the image correction parameters stored in the image sensing apparatus to the printing apparatus before printing the image data; and correcting, on the printing apparatus, the image data to be printed, using the read-out image correction parameters.

Further, the foregoing object is also attained by providing a control method for an image sensing apparatus capable of making image data printed by transmitting the image data to a printing apparatus, the method comprising: receiving information about image correction functions supported by the printing apparatus from the printing apparatus when the image sensing apparatus is connected to the printing apparatus; setting image correction parameters for correction of image data based on the received information about image correction functions; and storing the set image correction parameters.

Further, the foregoing object is also attained by providing a control method for a printing apparatus that receives and prints image data transmitted from an image sensing apparatus, the method comprising: transmitting information about image correction functions supported by the printing apparatus to the image sensing apparatus when the printing apparatus is connected to the image sensing apparatus; reading image correction parameters set by the image sensing apparatus based on the information about the image correction functions out of the image sensing apparatus before printing the image data; and correcting the image data to be printed, using the read-out image correction parameters.

Further, features of the present invention will become apparent from the following description of exemplary embodiments with reference to the attached drawings.

BEST MODE FOR CARRYING OUT THE INVENTION

Preferred embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1:
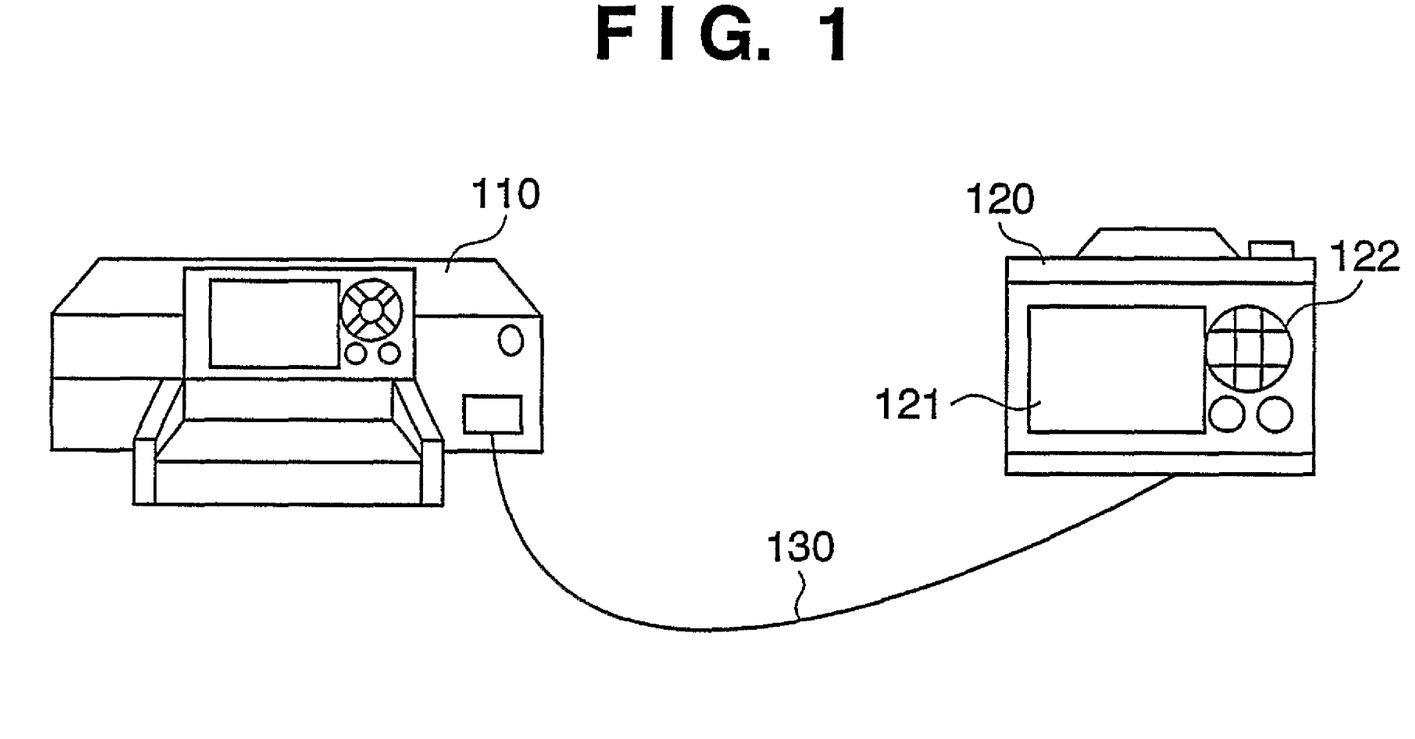
FIG. 1 is a diagram showing an overall configuration of a printing system according to an embodiment of the present invention.

FIG. 1 is a diagram showing an overall configuration of a printing system according to an embodiment of the present invention. In FIG. 1, reference numeral 110 denotes a printer and 120 denotes a digital camera. The digital camera 120 has a display 121 and a control switch 122. Reference numeral 130 denotes a communication cable such as a USB cable which connects the digital camera 120 and the printer 110.

Figure 2:
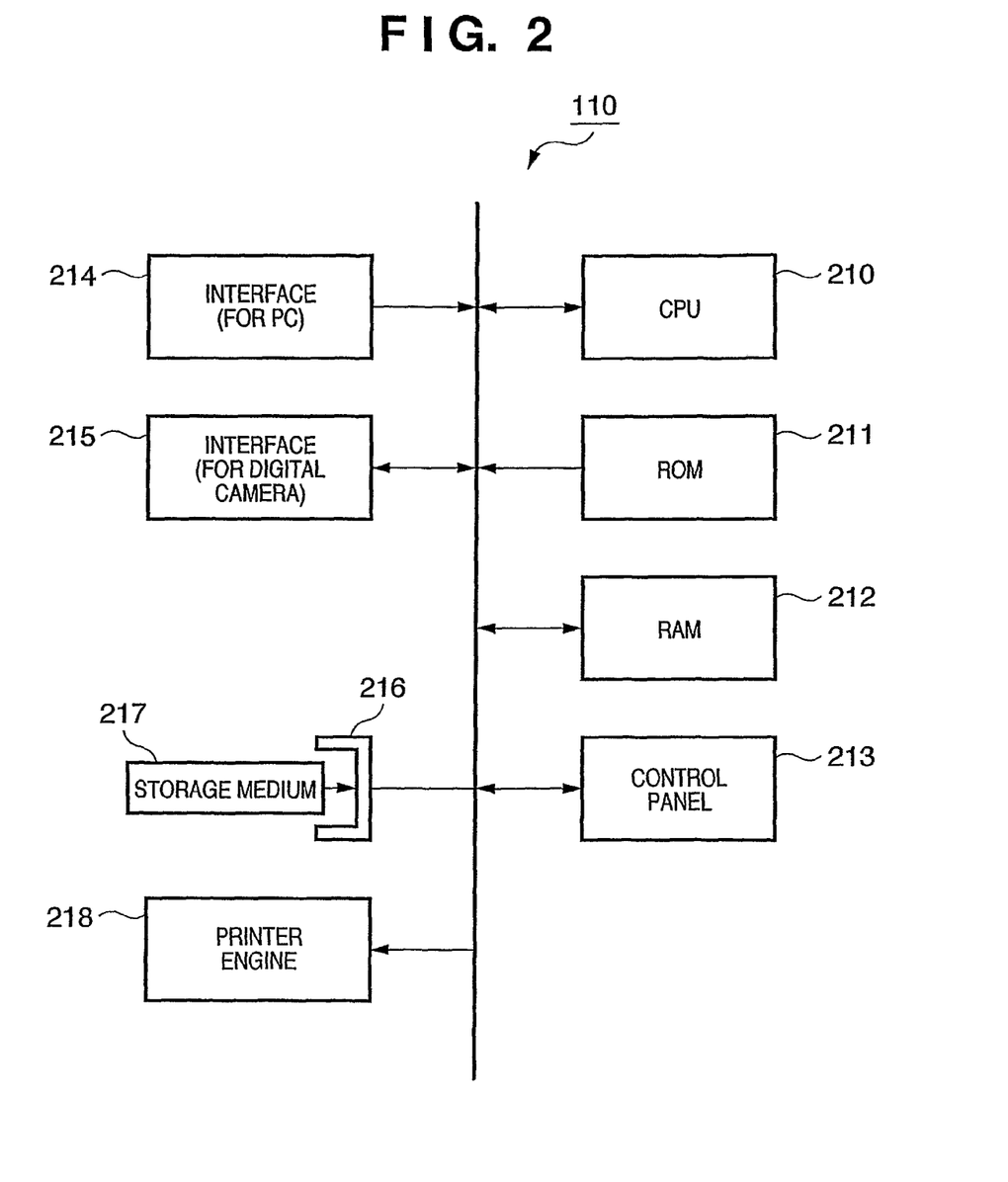
FIG. 2 is a block diagram showing a configuration of a control system of a printer according to an embodiment of the present invention.

FIG. 2 is a block schematic diagram of a control system of the printer 110 according to an embodiment of the present invention. In FIG. 2, reference numeral 210 denotes a CPU which controls the entire apparatus, 211 denotes a ROM which stores operating procedures (programs) of the CPU 210 and fonts, and 212 denotes a RAM used as a work area of the CPU 210. Reference numeral 213 denotes a control panel, 214 denotes an interface for connection to a PC, and 215 denotes an interface (USB host) for connection to the digital camera. Reference numeral 216 denotes a card interface capable of connecting an adaptor (e.g., PCMCIA-compliant) 217 equipped with a memory card. The card interface 216 is used to read a description file containing printing instructions concerning photos taken with the digital camera out of the memory card. Printing can be performed based on the description file read via the card interface 216. Reference numeral 218 denotes a printer engine.

Figure 3:
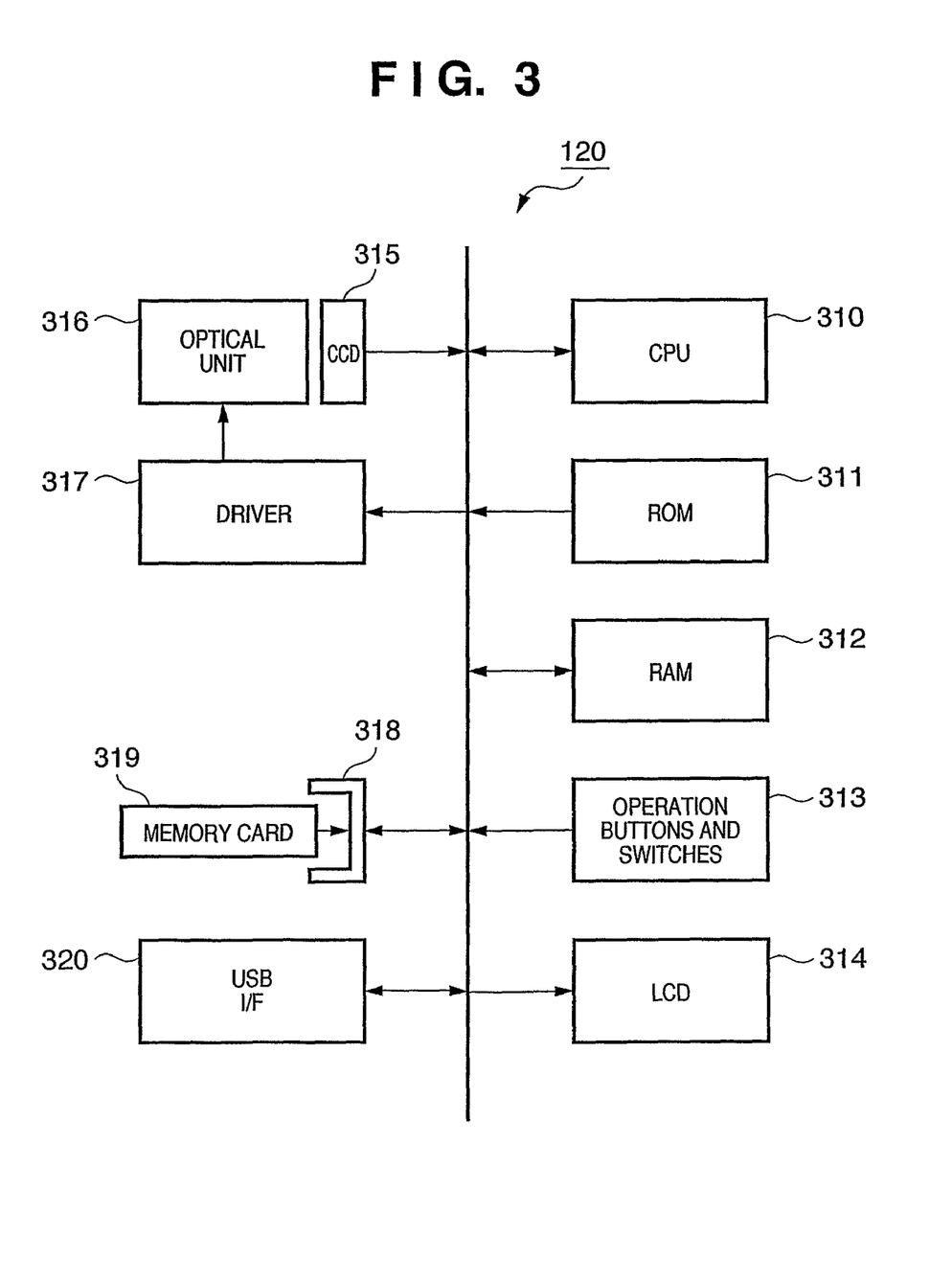
FIG. 3 is a block diagram showing a configuration of a digital camera according to an embodiment of the present invention.

FIG. 3 is a block schematic diagram of the digital camera 120. In FIG. 3, reference numeral 310 denotes a CPU which controls the entire digital camera 120, and 311 denotes a ROM which stores operating procedures (programs) of the CPU 310. Reference numeral 312 denotes a RAM used as a work area of the CPU 310, and 313 denotes a switch group used for various operations. Reference numeral 314 denotes a liquid crystal display used to check sensed images and display menus for various settings. Reference numeral 316 denotes an optical unit which mainly consists of lenses and a lens drive system. Reference numeral 315 denotes an image sensing element such as a CCD, and 317 denotes a driver which controls the optical unit 316 under the control of the CPU 310. Reference numeral 318 denotes a connector used to connect a recording medium 319 (such as Compact Flash (registered trademark), a memory card, Smart Media), and 320 denotes a USB interface (USB slave) for connection to a PC or the printer 110 according to this embodiment.

Regarding communication means between the digital camera and the printer, although SCSI, wireless TCP/IP, or other communication means may be used, connection via an USB interface will be described herein.

First Embodiment

Figure 4:
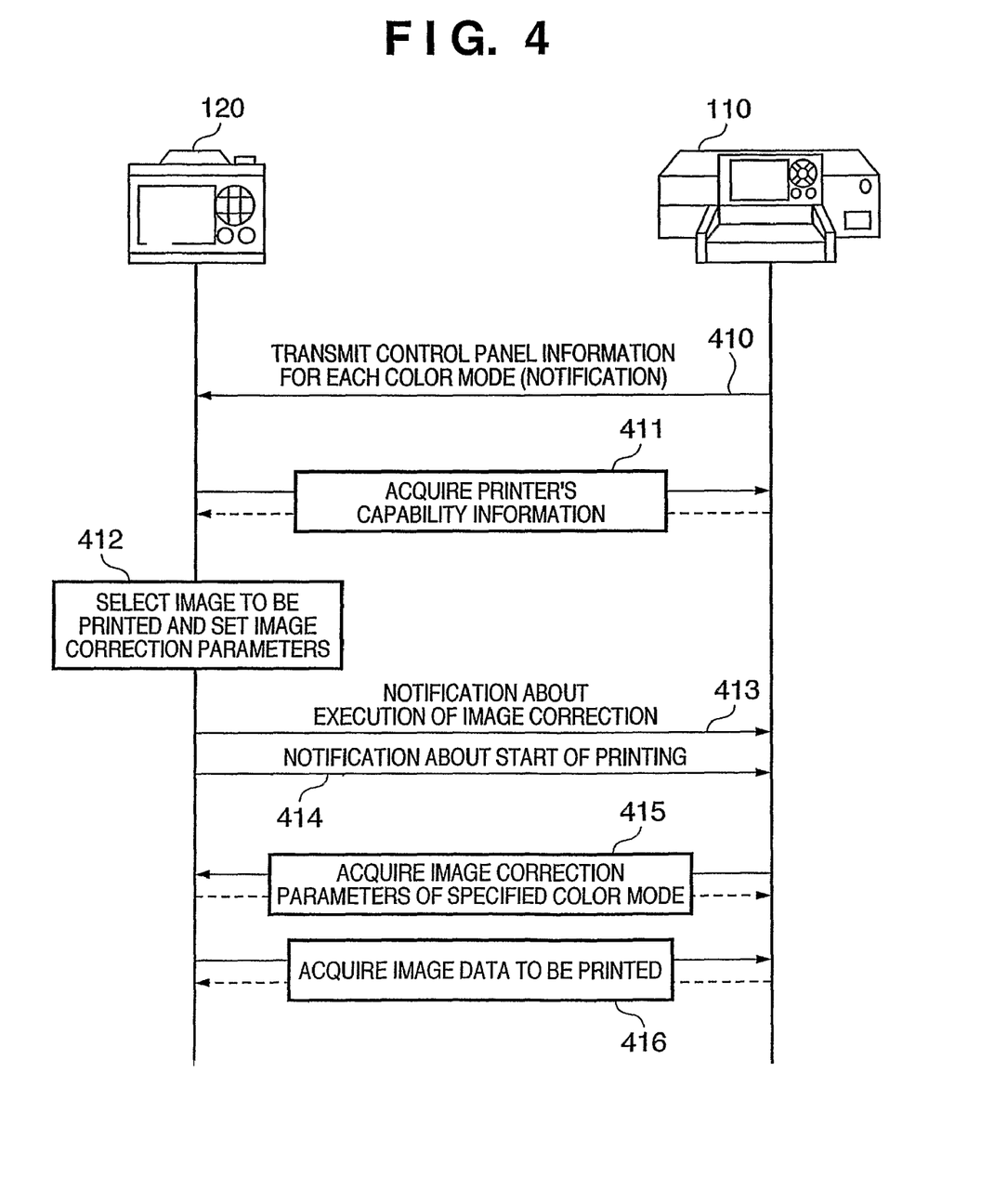
FIG. 4 is a diagram showing communication procedures according to a first embodiment of the present invention used when a digital camera and printer are connected.

FIG. 4 shows communication procedures carried out between the printer and the digital camera according to a first embodiment of the present invention.

In procedure 410, the printer 110 transmits, to the digital camera 120, control panel information (hereinafter referred to as "image correction parameter information") for each color mode for use to form a GUI on the camera. The image correction parameter information is related to image correction functions. It indicates what color modes the printer 110 supports and what image correction parameters are available in each color mode. The image correction parameter information is transmitted by the printer 110 to the camera 120 when the camera 120 is connected to the printer 110.

Figure 9:
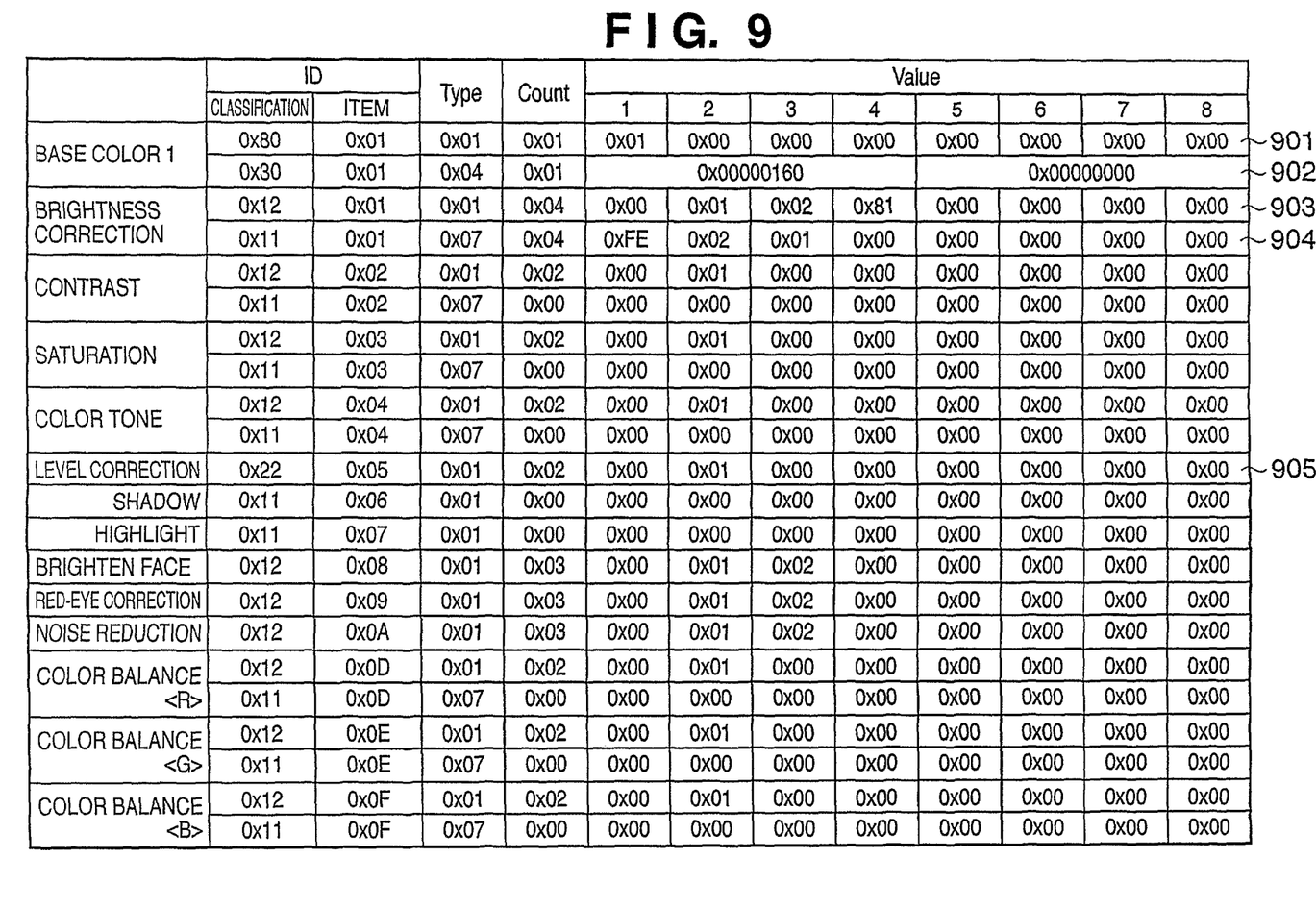
FIG. 9 is a diagram showing an example of a data block in image correction parameter information transmitted by the printer according to the first embodiment of the present invention.

FIG. 9 shows an example of a data block concerning one color mode and contained in the image correction parameter information transmitted by the printer 110 according to the first embodiment of the present invention. Items of the image correction parameter information transmitted from the printer 110 include, for example, Base Color, Brightness Correction, Contrast, Saturation, Color Tone, Adjust levels, Brighten Face, Red-eye Correction, Noise Reduction, and Color Balance.

One set of data is made up of four parts: ID Classification and Item, Type, Count, and Value. Type indicates the type of Value, Count indicates the number of values, and Value contains actual values. In the case of data 901, ID Classification is 0x80, meaning the start of image correction parameter information for one color mode. Also, ID Item contains a serial number of the color mode, Type contains 0x01, meaning that Value contains unsigned single-byte information, and Value contains 0x01 which is a specified color mode identification code. A value of Count equal to or larger than 2 means that the same image correction parameter information will be used for multiple color modes.

In the case of data 902, ID Classification is 0x30, meaning an address from the data block of the color mode indicated by the serial number in ID Item to the next data block whose ID Classification is 0x80. Also, Type contains 0x04, meaning that Value contains four-byte information, and Value describes the number of bytes to be skipped. Note that if there is no next data block whose ID Classification is 0x80, Count contains 0.

In the case of data 903, ID Classification is 0x12, showing contents which can be set for the image correction parameter item in ID Item. Count indicates the number of values while Value contains 0x00 meaning Default Setting, 0x01 meaning OFF, 0x02 meaning Auto, and 0x81 meaning Manual. Thus, in the case of data 903, four settings—Default Setting, OFF, Auto, and Manual—are available for the image correction parameter item Brightness Correction.

In the case of data 904, ID Classification is 0x11, indicating that values or a range of values available when data with the same ID Item and with ID Classification of 0x12 can be set to Manual are written. Type contains either 0x01 or 0x07 which means that Value contains signed single-byte information. A value of 4 in Count means a range of values, which are listed starting from the left: a minimum value, maximum value, step size, and initial value. A value of 1 in Count means that Value contains set values. Thus, in the case of data 904, since Manual is available as indicated in data 903, the value of Brightness Correction can be set manually in a range between the minimum value of −2 and the maximum value of +2 at step size of 1.

In the case of data 905, ID Classification is 0x22, which is the same as ID Classification of 0x12, except that there are multiple sets of data whose ID Classification is 0x11 after the data whose ID Classification is 0x22.

FIG. 9 shows a data block for one color mode, but if there are two or more color modes, image correction parameter information transmitted by the printer contains multiple data blocks.

The camera 120 interprets the image correction parameter information written in the above format and generates a GUI to be displayed on the liquid crystal display 314. Note that the format of the image correction parameter information according to the first embodiment is not limited to the one described above, and may be a format capable of identifying color modes and image correction parameter items or a format such as HTML composed of tags.

Figure 5:
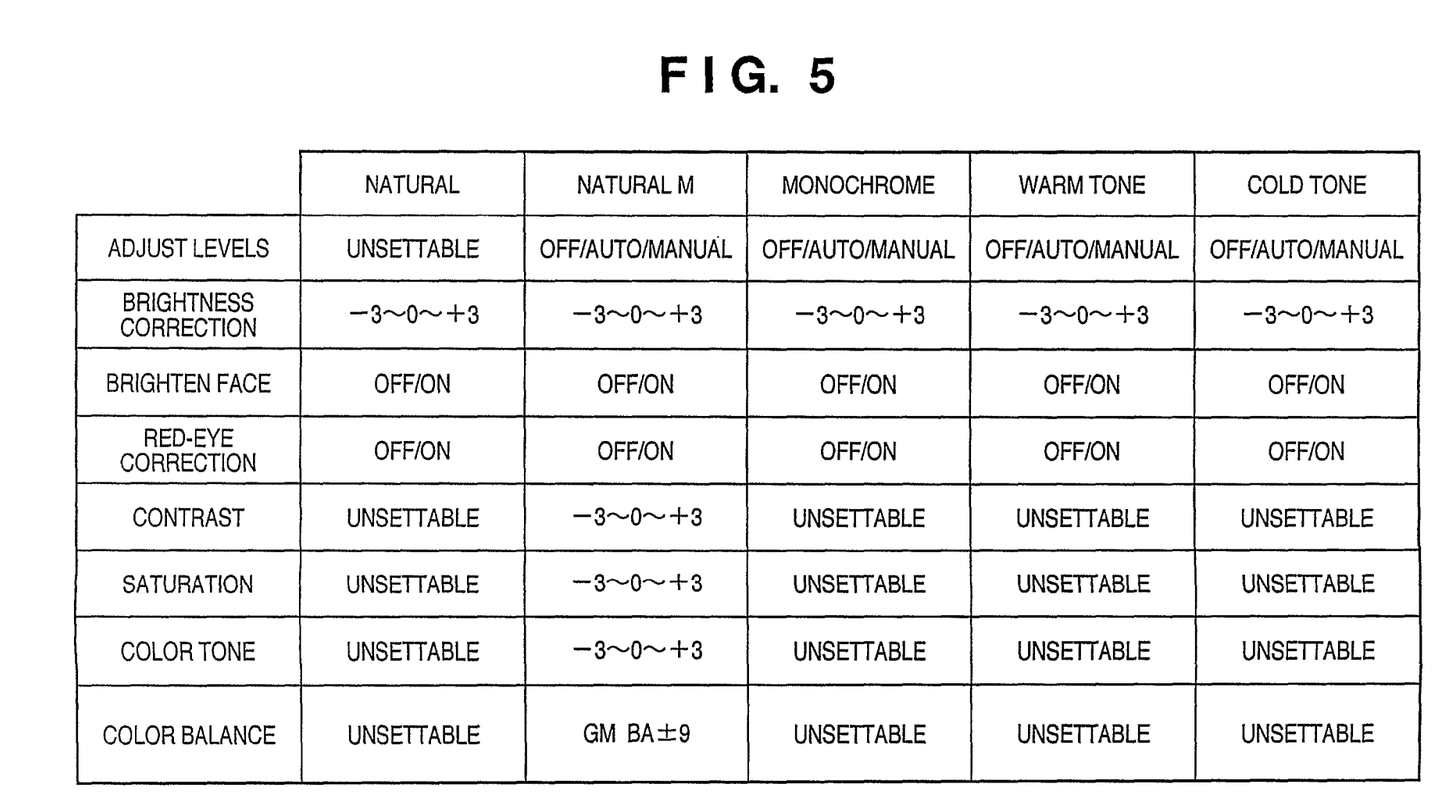
FIG. 5 is a diagram showing whether or not each image correction parameter value can be set in each color mode according to the first embodiment of the present invention.

FIG. 5 shows an exemplary table of image correction parameters in each color mode, citing Natural which corresponds to typical color printing, Natural M in which all the items of the image correction parameter information can be set, Black and White, Warm Tone, and Cold Tone as examples of color modes. For example, regarding the color mode of Natural M, the table contains the following values as the image correction parameter information shown in FIG. 9. Specifically, regarding Adjust levels in FIG. 9, for data whose ID Classification is 0x12, there are three values: OFF (0x01), Auto (0x02), and Manual (0x81). Regarding Brightness Correction, Contrast, Saturation, and Color Tone, Manual (0x81) is available for data whose ID Classification is 0x12 and values of data whose ID Classification is 0x11 can be set in a range between the minimum value of −3 and the maximum value of +3 at step size of 1. Regarding Brighten Face and Red-eye Correction, two values—OFF (0x01) and ON (0x02)—are available for data whose ID Classification is 0x12. Regarding Color Balance, Manual (0x81) is available for all RGB in the case of data whose ID Classification is 0x12 and values of data whose ID Classification is 0x11 can be set in a range between the minimum value of −9 and the maximum value of +9 at step size of 1.

Figure 6A:
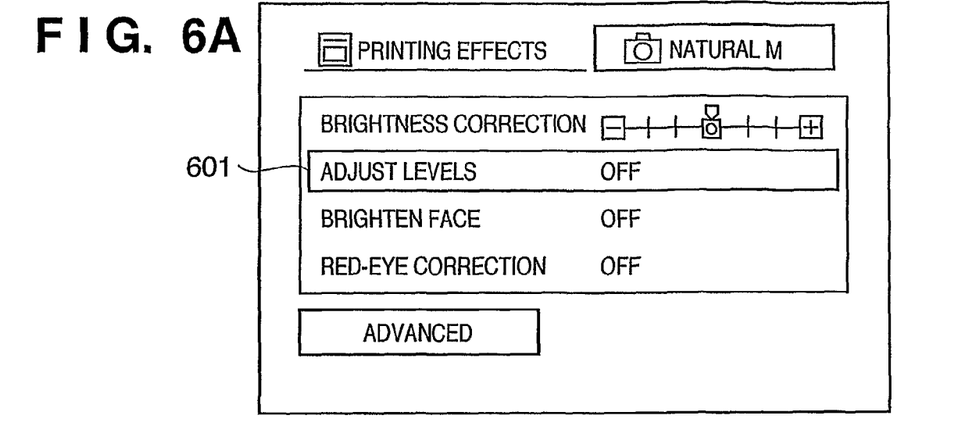
FIGS. 6A to 6C are diagrams showing exemplary GUIs on the digital camera according to the first embodiment of the present invention.
Figure 6B:
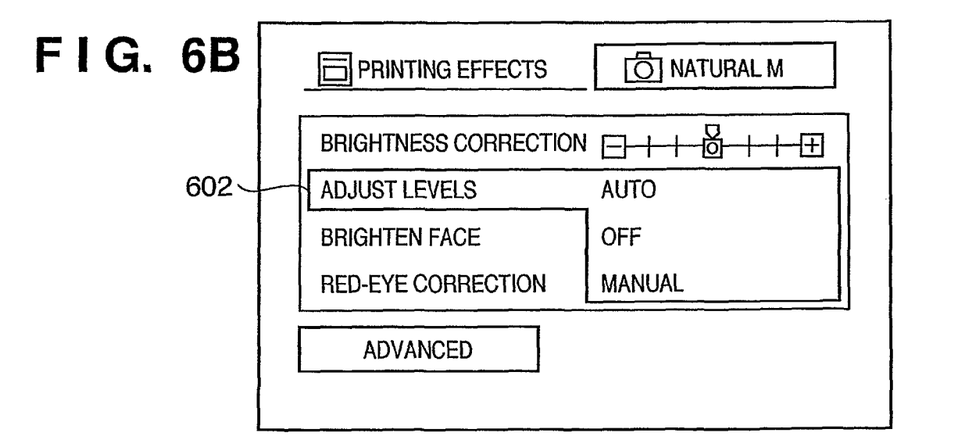
Figure 6C:
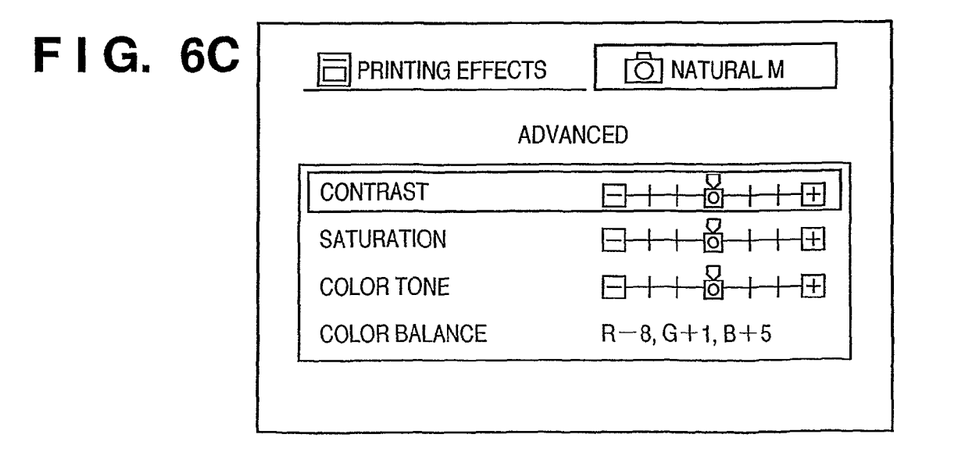

FIGS. 6A to 6C show exemplary GUIs displayed on the camera 120 when Natural M in FIG. 5 is selected. FIG. 6A shows a GUI created for Brightness Correction, Adjust levels, Brighten Face, and Red-eye Correction among the image correction parameter items based on the image correction parameter information. For example, when Adjust levels is selected (601), three options—OFF, Auto, and Manual—are made available as shown in FIG. 6B (602), allowing the user to set one of them. When the user selects Advanced, a GUI for Contrast, Saturation, Color Tone, and Color Balance appears allowing the user to make selections and settings based on the image correction parameter information.

Figure 7:
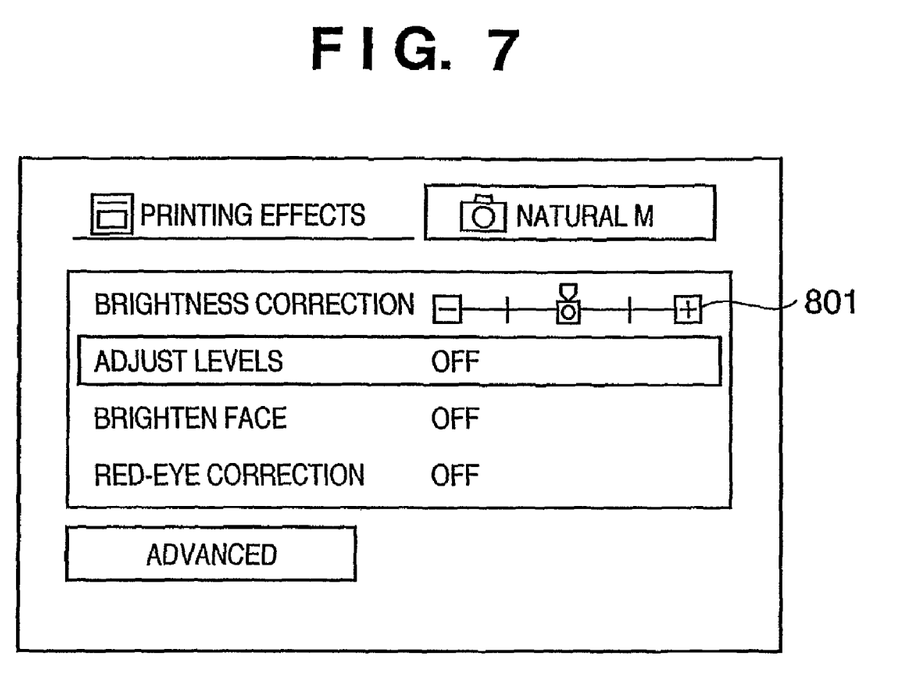
FIG. 7 is a diagram showing an exemplary GUI used to set image correction parameter values according to the first embodiment of the present invention.

Incidentally, if Classification of 0x12 for a parameter item in FIG. 9 provides only one of OFF (0x01) and Auto (0x02), for example, only OFF (0x01), "OFF" is displayed on the GUI, but grayed out and kept from being selected using the control switch 122 of the camera. Note that in the example of FIG. 6A, as the image correction parameter information, Brightness Correction which has seven levels from −3 to +3 at step size of 1, is allowed to be set using a slider bar GUI. Of course, the range and step size of the slider bar are not limited to those described above. For example, if the parameter item has five levels from −2 to +2 at step size of 1, the GUI is changed accordingly as exemplified by a slider bar 801 in FIG. 7.

Next, in procedure 411, the camera 120 acquires Capability information including paper sizes and paper types supported by the printer 110, as in the case of a direct print protocol such as PictBridge.

In procedure 412, using the GUI of the digital camera 120, the user is allowed to select images to be printed and a color mode as well as to set values for image correction parameter items based on the user's preferences. Hereinafter, the selected color mode and the values of image correction parameter items will be referred to collectively as "image correction parameter values." The image correction parameter values thus set are stored in the memory 312 of the digital camera 120. The "image correction parameter values" do not have to be numeric values. That is, correction conditions may be specified using character strings or symbols.

In procedures 413 and 414, printing is started. When starting printing, the digital camera 120 notifies the printer 110 in procedure 413 that image correction should be performed. Next, the digital camera 120 transmits a print job containing information needed to start printing, i.e., information about paper size, images to be printed, and the like to the printer 110 in procedure 414. Note that the notification about image correction may be included in the print job.

In procedure 415, since the printer 110 has been notified in procedure 413 that image correction should be performed, it reads the set image correction parameter values out of the memory 312 of the digital camera 120. The image correction parameter values may be read out any time: after the printer 110 receives the print job but before it acquires images; before the start of printing; before the image correction process; or the like.

Figure 10:
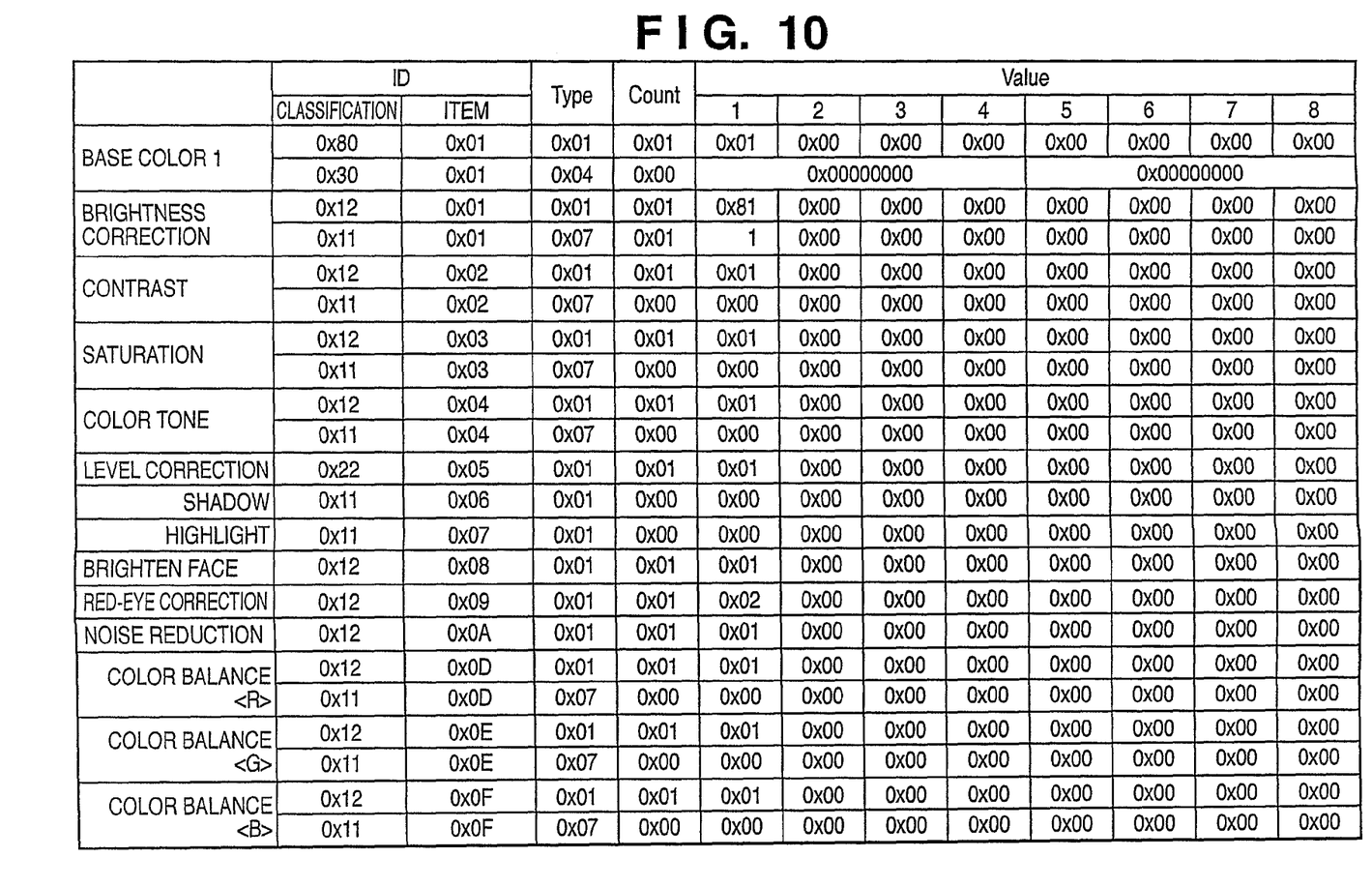
FIG. 10 is a diagram showing an example of image correction parameter values read out by the printer according to the first embodiment of the present invention.

However, it is convenient if the printer 110 acquires image correction parameter values before it acquires image data from the camera 120 because image acquisition conditions can be changed according to the parameters. For example, when it is clear that only part of image data is needed (e.g., when trimming has been specified), the printer can be controlled so as to acquire only the necessary image data from the camera 120. To acquire the image correction parameter values, the printer 110 instructs the camera 120 to transmit the image correction parameter values and the camera 120 reads the image correction parameter values out of the memory 312 and transmits them to the printer 110 in response. An exemplary format of image correction parameter values read out is shown in FIG. 10. ID Classification and Item, Type, Count, and Value are the same as those of the image correction parameter information in FIG. 9 transmitted by the printer 110, and so is the format. However, unlike the image correction parameter information in FIG. 9, there is always only one data block of image correction parameter values.

In procedure 416, according to the direct print protocol as in the case of procedure 411, the printer 110 receives image data to be printed, performs an image correction process based on the image correction parameter values, and prints the processed image data.

As described above, according to the first embodiment, with the printer and the digital camera connected directly, the camera is notified in advance of the image correction parameter information which can be set by the printer. This makes it possible to print on a printer while reflecting the user's preferences as well as making the most of functions of the printer, which may be not only a photo direct printer equipped with a control panel, but also a printer not equipped with a control panel or any of various types of printers ranging from low-end models to high-end models.

Also, since image correction parameter values and image files are held separately, it is possible to reduce, both on the camera and printer, the memory consumption and processing time required to load and parse image files and edit parameters compared to the technique disclosed in Japanese Patent Laid-Open No. 2002-314724.

Second Embodiment

Next, a second embodiment of the present invention will be described.

In the first embodiment, the image correction parameter values set on the GUI of the digital camera 120 are read out by the printer 110 only at the start of printing, thus the read values are valid for each print job. In contrast, according to the second embodiment, a unit that image correction parameter values become effective (referred to as "parameter effective unit" hereinafter) is switched between by print job and by image. Differences from the first embodiment will be described below.

Figure 8:
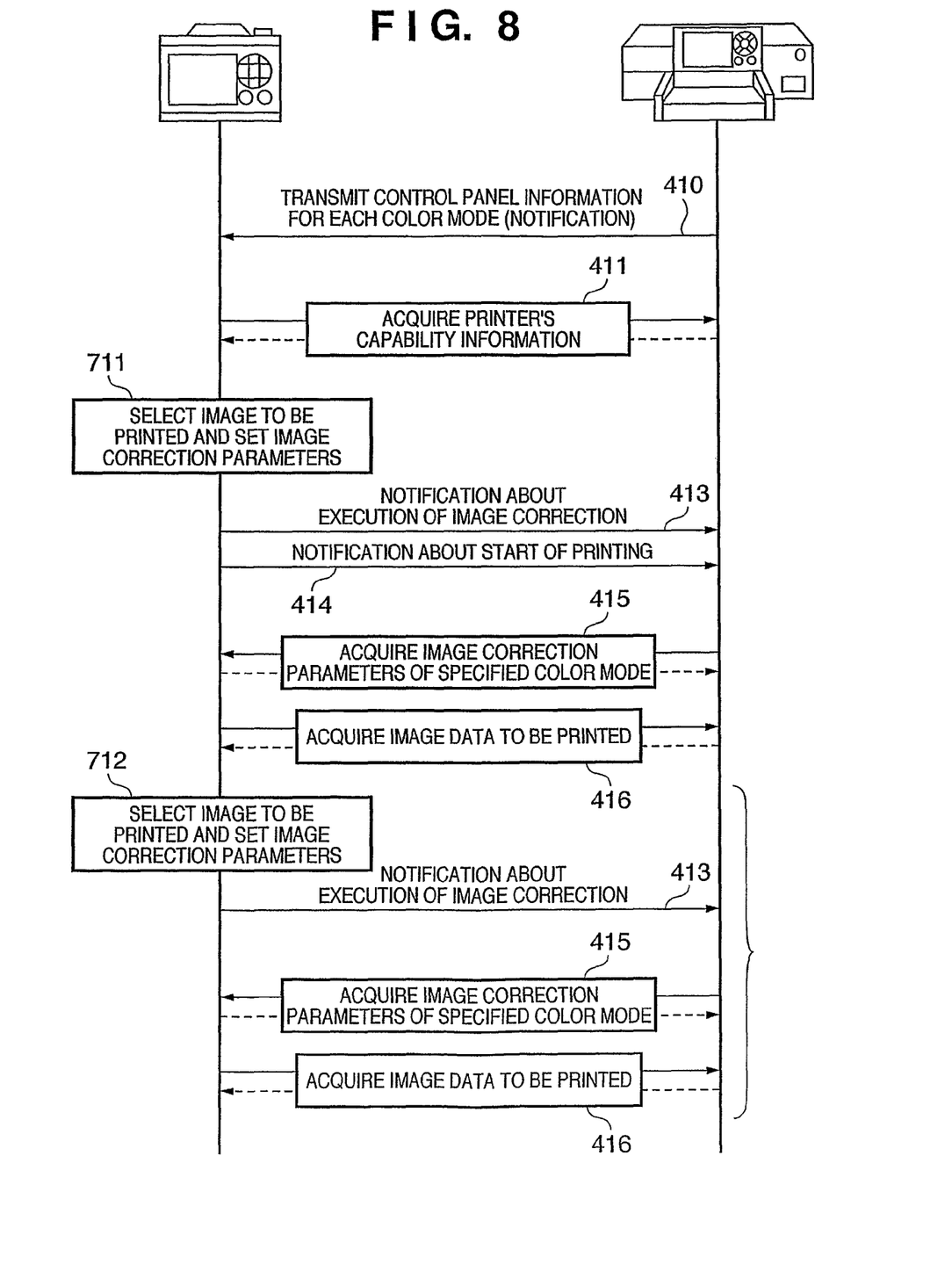
FIG. 8 is a diagram showing communication procedures according to a second embodiment of the present invention used when a digital camera and printer are connected.

FIG. 8 shows communication procedures carried out between the printer 110 and the digital camera 120 according to the second embodiment of the present invention. The procedures shown in FIG. 8 differ from those of the first embodiment in FIG. 4 in that procedure 412 is replaced by procedure 711 and in that procedure 712 is added. Description of the same procedures as in FIG. 4 will be omitted as appropriate. An example of printing two images will be described below.

Referring to FIG. 8, in procedure 411, the camera 120 acquires Capability information including paper sizes and paper types supported by the printer 110. In procedure 711, image correction parameter values 1 are set for the first image and stored in the memory 312. In so doing, an item which represents a parameter effective unit is added to the image correction parameter values of FIG. 10 and "By Image" is set as the parameter effective unit. Next, in procedure 413, the digital camera 120 notifies the printer 110 that image correction should be performed. In procedures 414 to 416, the printer 110 reads the image correction parameter values 1 for the first image out of the memory 312 of the digital camera 120 and acquires the image.

In procedure 712, while the printer 110 is printing the first image, the digital camera 120 sets image correction parameter values 2 for the second image, specifies that image correction should be performed by image, and stores the settings in the memory 312. After procedure 712, the digital camera 120 notifies the printer in procedure 413 that image correction of the second image will be performed. Consequently, by parsing the image correction parameter values 1, the printer 110 learns that the parameter effective unit is image and that image correction of the second image will be performed. Thus, at an appropriate time after the first image is printed but before the second image is printed, the image correction parameter values 2 are read out of the memory 312 of the digital camera 120 (procedure 415) and the second image is acquired and printed (procedure 416). This makes it possible to print the second image by correcting it using the image correction parameter values 2.

In this way, by repeating procedures 712 to 416, it is possible to set different image correction parameter values for different images. Note that if procedure 712 for setting image correction parameter values is omitted on the digital camera 120, the second image is corrected based on the image correction parameter values 1. Also, the same operation as in the first embodiment can be performed if the printer 110 is notified in procedure 711 that image correction will be performed by print job rather than by image or if the parameter effective unit is not added to the image correction parameter values.

Note that instead of simply repeating procedures 712 to 416, it is alternatively possible to specify multiple images to be printed in advance and set image correction parameters separately for the multiple images in procedure 712 before repeating procedures 415 to 416.

In that case, multiple sets of image correction parameter values are stored in the memory 312 of the digital camera 120 in procedure 712, and then image correction parameters for the image to be printed are acquired when repeating procedures 415 and 416.

As described above, the second embodiment makes it possible to print each image while reflecting the user's preferences when printing multiple images or multiple copies of an image. Also, since the printer reads the image correction parameter values out of the memory of the digital camera each time an image is printed even when printing multiple images, there is no need to hold the image correction parameter values for all the images. This makes it possible to reduce the memory consumption of the printer.

In particular, the effect of the above configuration becomes more significant as the total amount of information of image correction parameter values grows along with expansion in functionality of printers and digital cameras.

Third Embodiment

Next, a third embodiment of the present invention will be described.

In the third embodiment, description will be given of parameter effective conditions of image correction parameter values on the printer 110, the image correction parameter values being read by the printer 110 out of the memory 312 of the digital camera 120. Here, conditions for using the image correction parameter values in the printer 110 after the image correction parameter values are read by the printer 110 out of the memory 312 of the digital camera 120 are set as the parameter effective conditions. Three examples of parameter effective conditions are shown below.

Image correction parameter values are held in the printer as values set on the control panel of the printer (control panel setting). This makes it possible to perform correction by using the same image correction parameter values for PC printing as well as for printing with a recording medium inserted directly in the printer (card direct printing). Even after communications between the digital camera 120 and the printer 110 are disconnected, the same print conditions can be applied when the same digital camera or another digital camera is connected again to the printer.

With a USB connection, image correction parameter values are used not only for direct printing, but also for printing from a PC (PC printing) and printing with a recording medium inserted directly in the printer (card direct printing). However, settings of the image correction parameter values can be reflected only when the digital camera is connected to the printer via USB. After the USB connection is disconnected, conditions set on the control panel of the printer are used for PC printing and card direct printing (camera setting).

Image correction parameter values are used only for direct printing from a camera via USB, and values set on the control panel of the printer are used for PC printing and card direct printing (direct-print setting).

According to the third embodiment, an item which represents a parameter effective condition is added to the image correction parameter values described with reference to FIG. 10 so that any of the "control panel setting," "camera setting," and "direct-print setting" can be specified.

According to the third embodiment, communications are conducted between the printer 110 and the digital camera 120 using the same procedures as the procedures according to the first embodiment in FIG. 4. In procedure 412, the item which represents a parameter effective condition as well as the image correction parameter values for the image described in the first embodiment are specified and stored in the memory 312. Next, procedures 413 to 416 are carried out. The printer 110 parses the image correction parameter values read out of the memory 312 of the digital camera 120 and corrects the image using, image correction parameter values corresponding to the results of parsing to print it. For example, if "direct-print setting" is specified as the parameter validation condition of the image correction parameter values, the image correction parameter values read out of the memory 312 are used for correction only when printing from the digital camera via USB communications. PC printing and card direct printing use values set on the printer's control panel even if a USB connection is made.

In this way, by setting a parameter validation condition, it is possible to prevent an unintended or unnecessary image correction process during PC printing or card direct printing even if a USB connection is made.

Other Embodiments

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-026178, filed on Feb. 2, 2006, which is hereby incorporated by reference herein in its entirety.

The invention claimed is:

1. A printing system in which a printing apparatus and an image sensing apparatus are connected and image data transmitted by the image sensing apparatus is printed by the printing apparatus, wherein the image sensing apparatus comprises:
(a) a function information reception unit that receives, from the printing apparatus, information about image correction functions supported by the printing apparatus,
(b) a selection unit configured to select an image to be printed,
(c) a setting unit that sets image correction parameters for correction of image data of the selected image based on the information about image correction functions received by said function information reception unit,
(d) a storage unit that stores the image correction parameters set by said setting unit independent of the image data,
(e) a notification transmission unit configured to transmit, to the printing apparatus, a notification of image correction to correct the image data of the selected image in a case where the image correction parameters are set by said setting unit,
(f) a print job transmission unit configured to transmit, to the printing apparatus, a print job designating the selected image to be printed, and
(g) an image transmission unit configured to transmit, to the printing apparatus, image data of the selected image to be printed, wherein the printing apparatus comprises:
(a) a function information transmission unit that transmits to the image sensing apparatus the information about the image correction functions that the printing apparatus supports,
(b) a notification reception unit configured to receive the notification of image correction from said notification transmission unit,
(c) a print job reception unit configured to receive the print job from said print job transmission unit,
(d) an image reception unit configured to receive the image data of the selected image designated to be printed in the print job received by said print job reception unit,
(e) a parameter reception unit configured to, if said notification reception unit received the notification, receive the image correction parameters stored in said storage unit after receiving by said print job reception unit of the print job and before receiving by said image reception unit of the image data, and
(f) a correction unit that corrects the image data of the selected image to be printed, using the image correction parameters received by said parameter reception unit, and wherein said notification unit transmits the notification of image correction to the printing apparatus before said print job transmission unit transmits the print job and said image transmission unit transmits the image data.

2. An image sensing apparatus capable of directly communicating with a printing apparatus which prints an image based on image data transmitted from the image sensing apparatus, the image sensing apparatus comprising:

a function information reception unit that receives information about image correction functions supported by the printing apparatus from the printing apparatus when the image sensing apparatus is connected to the printing apparatus;
a selection unit configured to select an image to be printed;
a setting unit that sets image correction parameters for correction of image data of the selected image based on the information about image correction functions received by said function information reception unit;
a storage unit that stores the image correction parameters set by said setting unit independent of the image data;
a parameter transmission unit configured to transmit the image correction parameters stored in the storage unit;
a notification transmission unit configured to transmit, to the printing apparatus, a notification of image correction to correct the image data of the selected image in a case where the image correction parameters are set by said setting unit;
a print job transmission unit configured to transmit, to the printing apparatus, a print job designating the selected image to be printed; and
an image transmission unit configured to transmit, to the printing apparatus, image data of the selected image to be printed, wherein said parameter transmission unit transmits the image correction parameters after the print job is transmitted by said print job transmission unit and before the image data of the selected image is transmitted by said image transmission unit, and wherein said notification transmission unit transmits the notification of image correction to the printing apparatus before said print job transmission unit transmits the print job and said image transmission unit transmits the image data.

3. The image sensing apparatus according to claim 2, wherein when the image correction parameters are set by said setting unit, the image sensing apparatus transmits the notification of image correction to the printing apparatus.

4. The image sensing apparatus according to claim 2, wherein said setting unit further sets a condition for performing correction on the printing apparatus using the set image correction parameters, and
wherein said storage unit further stores the set condition.

5. The image sensing apparatus according to claim 4, wherein the condition is one of a plurality of conditions including at least conditions that all image data to be printed on the printing apparatus is included, that image data has been transmitted via predetermined communication means, and that image data has been transmitted from the image sensing apparatus.

6. The image sensing apparatus according to claim 2, wherein the image sensing apparatus and the printing apparatus communicate with each other using a predetermined direct print protocol, and
wherein the transmission of the print job by said print job transmission unit and the transmission of the image data by said image transmission unit are performed using the predetermined direct print protocol.

7. The image sensing apparatus according to claim 6, wherein the reception of the information about image correction functions by said function information reception unit is performed using the predetermined direct print protocol.

8. The image sensing apparatus according to claim 2, wherein said selection unit is configured to further select print conditions,
wherein said print job transmission unit transmits the print job designating both the image and the print conditions, and
wherein said notification unit further transmits a notification to make the printing apparatus perform correction on the image data in addition to the printing conditions designated in the print job.

9. A printing apparatus capable of directly communicating with an image sensing apparatus, the printing apparatus comprising:
a function information transmission unit that transmits to the image sensing apparatus information about image correction functions that the printing apparatus supports when the printing apparatus is connected to the image sensing apparatus;
a notification reception unit configured to receive a notification of image correction to correct image data from the image sensing apparatus;
a print job reception unit configured to receive a print job from the image sensing apparatus;
an image reception unit configured to receive, from the image sensing apparatus, image data of an image to be printed designated in the print job received by the print job reception unit;
a parameter reception unit configured to, if the notification reception unit received the notification, receive, from the image sensing apparatus, image correction parameters set by the image sensing apparatus based on the information about the image correction functions after said print job reception unit receives the print job and before said image reception unit the image data to be printed; and a correction unit that corrects the image data of the selected image to be printed, using the image correction parameters received by said parameter reception unit,
wherein said notification reception unit receives the notification of image correction from the image sensing apparatus before said print job reception unit receives the print job and said image reception unit receives the image data of the image to be printed.

10. The printing apparatus according to claim 9, wherein the image correction parameters further include a condition for performing correction using the image correction parameters, and
wherein said correction unit corrects the image data using the image correction parameters when the condition is satisfied.

11. The printing apparatus according to claim 10, wherein the condition is one of a plurality of conditions including at least conditions that all image data to be printed on the printing apparatus is included, that image data has been transmitted via predetermined communication means, and that image data has been transmitted from the image sensing apparatus.

12. A control method for a printing system in which a printing apparatus and an image sensing apparatus are connected and image data transmitted by the image sensing apparatus is printed by the printing apparatus, the control method comprising:
transmitting information about image correction functions supported by the printing apparatus from the printing apparatus to the image sensing apparatus;
selecting an image to be printed on the image sensing apparatus;
setting image correction parameters in order for the image sensing apparatus to correct image data of the selected image, based on the transmitted information about the image correction functions;
storing the set image correction parameters in the image sensing apparatus independent of the image data;
transmitting to the printing apparatus a notification of image correction to correct the image data of the selected image in a case where the image correction parameters are set;
transmitting a print job designating the selected image to be printed from the image sensing apparatus to the printing apparatus;
transmitting image data of the selected image to be printed from the image sensing apparatus to the printing apparatus;
transmitting the image correction parameters stored in the image sensing apparatus to the printing apparatus after the print job is transmitted and before the image data is transmitted from the image sensing apparatus to the printing apparatus; and
correcting, on the printing apparatus, the image data to be printed, using the image correction parameters,
wherein the notification of image correction is transmitted before the print job and the image data are transmitted.

13. A control method for an image sensing apparatus capable of directly communicating with a printing apparatus which prints an image based on image data transmitted from the image sensing apparatus, the control method comprising:
receiving information about image correction functions supported by the printing apparatus from the printing apparatus when the image sensing apparatus is connected to the printing apparatus;

selecting an image to be printed;
setting image correction parameters for correction of image data of the selected image based on the received information about image correction functions;
storing the set image correction parameters independent of the image data;
transmitting to the printing apparatus a notification of image correction to correct the image data of the selected image in a case where the image correction parameters are set;
transmitting to the printing apparatus the image correction parameters;
transmitting a print job designating the selected image to be printed to the printing apparatus; and
transmitting image data of the selected image to be printed to the printing apparatus,
wherein the image correction parameters are transmitted after the print job is transmitted and before the image data of the selected image is transmitted, and
wherein the notification of image correction is transmitted before the print job and the image data are transmitted.

14. A non-transitory readable storage medium containing a program that is executable by a printing apparatus and is intended to implement the control method according to claim 13.

15. A control method for a printing apparatus that receives and prints image data transmitted from capable of directly communicating with an image sensing apparatus, the control method comprising:

transmitting information about image correction functions supported by the printing apparatus to the image sensing apparatus when the printing apparatus is connected to the image sensing apparatus;
receiving a notification of image correction to correct image data from the image sensing apparatus;
receiving a print job from the image sensing apparatus;
receiving image data of an image to be printed designated in the print job;
receiving, if the notification of image correction is received, image correction parameters set by the image sensing apparatus based on the information about the image correction functions from the image sensing apparatus after receiving the print job and before receiving the image data of the image to be printed from the image sensing apparatus; and
correcting the image data of the image to be printed, using the received image correction parameters,
wherein the notification of image correction is transmitted before said receiving of the print job and said receiving of the image data.

16. A non-transitory readable storage medium containing a program that is executable by an image sensing apparatus and is intended to implement the control method according to claim 15.

* * * * *